United States Patent [19]

Sisler

[11] 3,914,031

[45] Oct. 21, 1975

[54] IMAGING DEVICE FOR CREATING THE APPEARANCE OF A MISSING ANATOMICAL MEMBER

[76] Inventor: Hampson A. Sisler, 34 W. 12th St., New York, N.Y. 10011

[22] Filed: Aug. 14, 1974

[21] Appl. No.: 497,338

[52] U.S. Cl. ............... 350/298; 350/299; 350/169; 351/41; 351/158
[51] Int. Cl.² ..................... G02B 7/18; G02C 1/00
[58] Field of Search .......... 350/298, 299, 301, 303, 350/304, 248, 169, 172; 351/41, 50, 158; 272/8 M, 8.5, 13; 46/1 F

[56] References Cited
UNITED STATES PATENTS

| | | | |
|---|---|---|---|
| 769,799 | 9/1904 | Hopkins | 272/8 M |
| 1,140,148 | 5/1915 | Furber | 272/8 M |
| 1,729,472 | 9/1929 | Behning | 272/8 M |
| 2,371,196 | 3/1945 | Swan | 350/298 |

Primary Examiner—Vincent P. McGraw
Assistant Examiner—Jon W. Henry
Attorney, Agent, or Firm—Kane, Dalsimer, Kane, Sullivan and Kurucz

[57] ABSTRACT

A method and device for creating the appearance of an anatomical member of a pair when one of the members is missing. The image of the present anatomical member is sensed and projected from the proper location of the missing member thereby reproducing the appearance of the present member at the proper location for the missing member and creating the illusion that both anatomical members are present.

6 Claims, 4 Drawing Figures

IMAGING DEVICE FOR CREATING THE APPEARANCE OF A MISSING ANATOMICAL MEMBER

BACKGROUND OF THE INVENTION

There are significant numbers of people who are missing an anatomical member such as an eye, an ear or a finger for a great variety of reasons. A common means for remedying the deficiency is to provide a tangible mechanical prosthetic in substitution of the missing part of the body. The substituted member is generally quite rigid and inanimated. Therefore, the appearance is not as cosmetically pleasing as one would desire. It is often quite easy to detect that the substituted part is not real and the resultant artificial appearance is undesirable.

It can be readily envisioned how the appearance of a member at the location of the missing member which would be naturally animated and cosmetically pleasing would be extremely desirable. Additionally, the more natural the appearance at the location of the missing member, the more desirable and satisfactory the resultant condition would be.

SUMMARY OF THE INVENTION

With the above background in mind, it is among the primary objectives of the present invention to provide, in lieu of tangible, mechanical prosthetics to substitute for missing parts of the body, the use of a device which images normally functioning and moving part of the body and projects the image from the site of a missing part, as a cosmetic, visible and animated, though not tangible, substitute. Where an anatomical member of a pair is missing, the appearance of the other anatomical member is recreated at the location of the missing member by sensing the image of the present anatomical member and projecting the image to the proper location for the missing member. The resultant image creates the illusion that both anatomical members are present.

In one environment a pair of cosmetic eyeglasses can be provided for patients who have been surgically exenterated. The glasses have an internal imaging system whereby the normal, remaining eye is used as the subject of the imaging system so that the normal remaining eye is actually seen by the viewer twice. First, it appears directly from the present eye and again projected from the other side of the cosmetic glasses. The imaging system can be constructed of a system of mirrors, a fiber optics system or other conventional optical imaging system. Hence, the patient would appear to have two matching and normally moving eyes as in the normal state.

The present system is advantageous in that it provides total and perfect mobility of the prosthetic image as opposed to a stationary stare in a mechanical substitute. Also, the cosmetic eyeglass can be mass produced thereby reducing the cost. The resultant eyeglass would work for everyone and custom made artistic sculpturing utilized in mechanical substitutes would be unnecessary.

The general concept can be applied to other parts of the body such as imaging a normal ear and projecting the image from the other side of the head so that the patient shy one ear would appear to have two perfectly matching ears. Another utilization would be in dealing with a missing finger. The adjoining normal finger of the same hand can be imaged which is sensed and projected from the site of the finger stump with appropriate enlargement or reduction in size according to the normal size of the missing member so that the image prosthetic would move exactly with the finger which was used to produce the image. The advantage would be perfect cosmetic approximation of the missing part and full motion rather than stillness.

With the above objectives, among others, in mind reference is had to the attached drawings.

DESCRIPTION OF THE PREFERRED EMBODIMENTS

Figure 1:
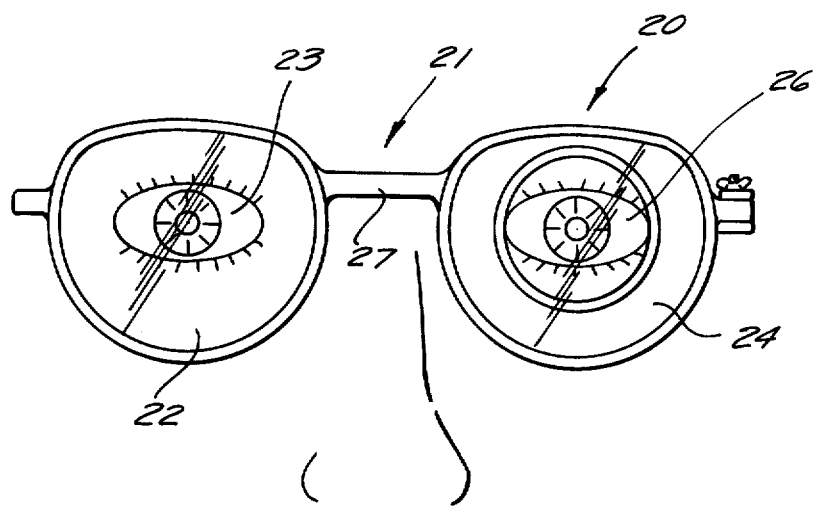
FIG. 1 is a front elevation view of the imaging device shown in producing a prosthetic image at the location of a missing eye of a patient.
Figure 2:
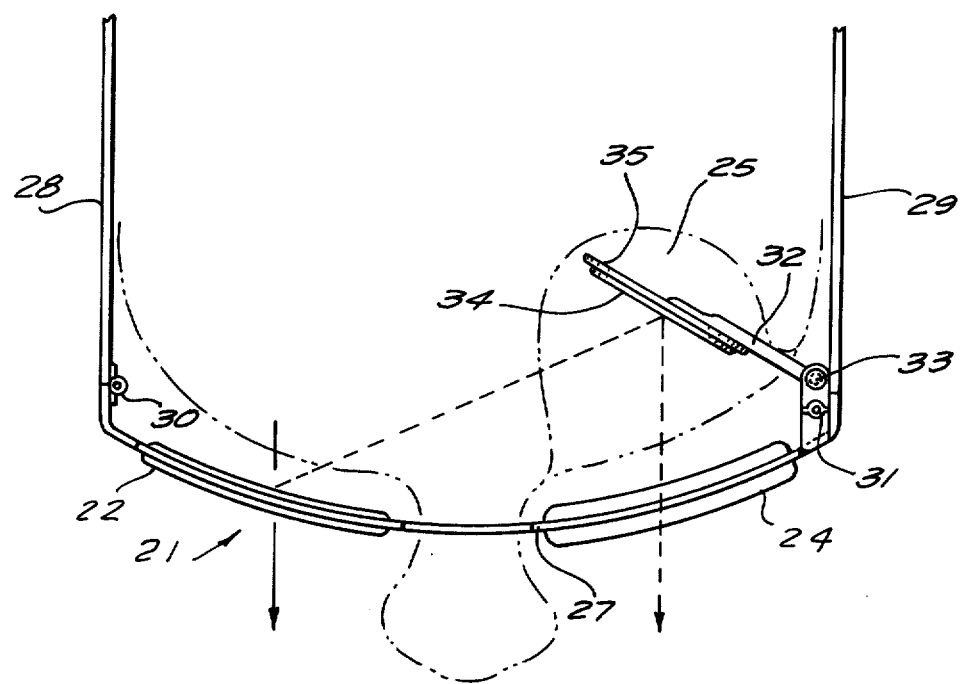
FIG. 2 is a top plan view thereof with arrows showing the image travel path.
Figure 3:
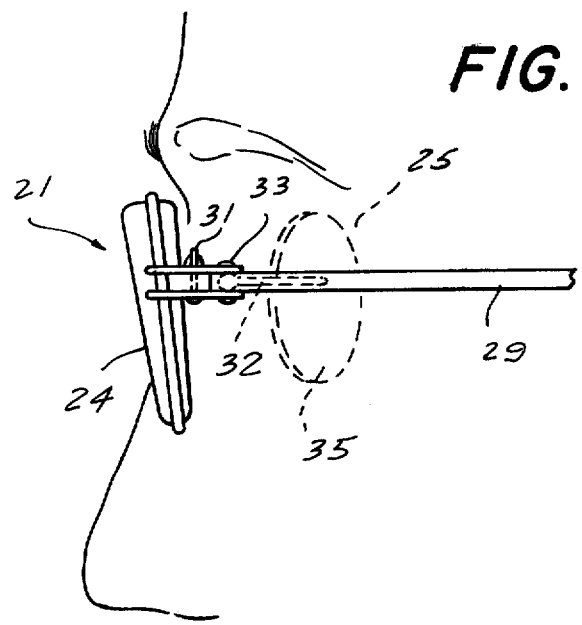
FIG. 3 is an end view thereof.

Imaging device 20 is depicted in the environment for use with a patient having a missing eye. The structure employed for imaging device 20 in that environment includes a pair of cosmetic prosthetic eyeglasses 21 with one lens 22 in alignment with the present eye 23 of the patient and the other lens 24 in alignment with the location 25 of the missing eye of the patient. FIGS. 1–3 of the drawings depict one type of image sensing and projecting means which may be employed for creating of the prosthetic image 26.

Eyeglasses 21 include a general eyeglass structure consisting of frame 27 and a pair of opposing tangs 28 and 29 for positioning the eyeglasses on the wearer. Tangs 28 and 29 are pivotally connected to frame 27 by the use of hinges 30 and 31.

Lenses 22 and 24 are positioned in frame 27 for alignment with the eyes of the wearer when the tangs are positioned on the wearer's ears. Device 20 includes an extension on hinge 31 for attaching an arm 32 by means of pivot pin 33. Arm 32 is free to pivot about pin 33 between tang 29 and lens 24. A mirror 34 is mounted on the free end of arm 32 so that as arm 32 is pivoted, the mirror is reoriented with respect to lenses 22 and 24. Mirror 34 is mounted in a conventional manner to arm 32 such as shown by mechanically holding the mirror within a socket 35 on the end of arm 32 with an annular retaining lip on the socket engaging the mirror and holding it in position. The mirror can also be epoxied in place and fastened in other conventional manner such as by screws or rivets. Arm 32 can be pivoted to accommodate the individual wearer. With arm 32 in proper position so that mirror 34 is located properly for projecting a desired image and the eyeglasses are positioned on the wearer, the image from the present eye 23 will be reflected from the inside surface of lens 22 in alignment therewith onto the surface of mirror 34 which in turn will project the image through lens 24. The path of the image is depicted by dotted lines in FIG. 2. Arrows show the projected image of the present eye 23 and the prosthetic image eye 26. The resultant image 26 will be a reproduction of eye 23 creating the illusion that the wearer has two eyes in proper location. Therefore, when he shifts his present eye 23 in a different location to look at an object the prosthetic image 26 will similarly move thereby animating the image and improving the cosmetic appearance of the prosthetic image.

Figure 4:
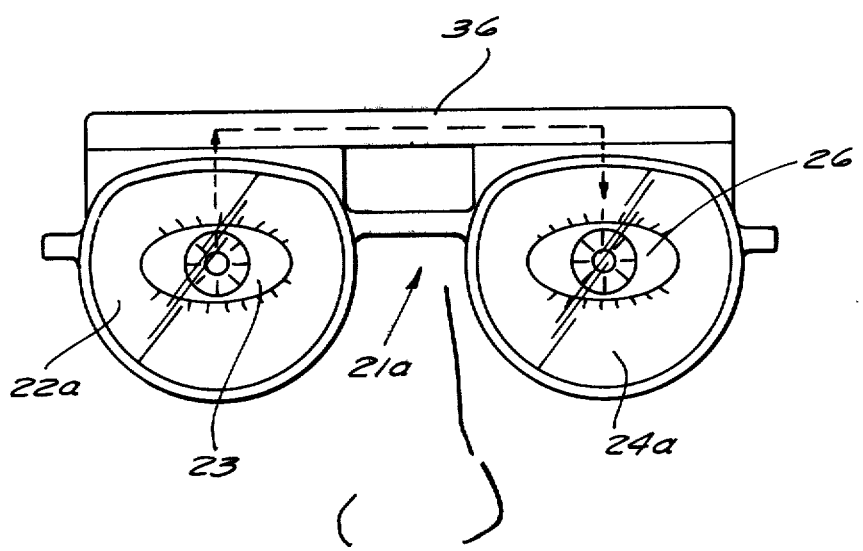
FIG. 4 is a front elevation view of an alternate embodiment of the imaging device.

Other means are naturally available for creation of the prosthetic image such as by means of a fiber optics arrangement as depicted in FIG. 4. Like components are provided with like numerals in the embodiment of FIG. 4 as in the previously discussed embodiment with the addition of the subscript $a$.

Eyeglass fram 21a is substantially identical to eyeglass frame 21 of the previous embodiment with the exception that the structure provided for the mirror is not necessary and is replaced by a fiber optics system 36. The fiber optics system is of the conventional type including fiber optic bundles. It is mounted in fixed position in a conventional manner to the eyeglass in alignment with the wearer's present eye 23 so that the image therefrom is sensed and projected from the missing eye location 25 as a prosthetic image 26. When the wearer has the eyeglasses properly positioned on himself, lens 22a will be in alignment with present eye 23 of the wearer and lens 24a will be in alignment with the prosthetic image 26. The resultant cosmetic appearance will be identical as in that of the previous embodiment with the created illusion that the wearer has a pair of eyes and the projected image is animated in that it will move when the present eye 23 moves. The path of sensing and projection of the image is depicted by the arrows and dotted lines in FIG. 4.

As discussed above, the present system is adapted for use in connection with patients having missing ears or missing fingers or other missing anatomical members where a present anatomical member can be partially or completely reproduced at a different location on the body to create a prosthetic image and the illusion that the missing member is present.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. An imaging device for creating the appearance of an anatomical member of a pair when one of the members is missing comprising: a supporting structure, means on the supporting structure for removably mounting the imaging device on a human being at the location of the missing and present anatomical members, imaging sensing and projecting means on the supporting structure and positioned so that the image of the present anatomical member is displaced to the location of the missing anatomical member and the image projected from the location of the missing anatomical member matches the present anatomical member with respect to size, contour and actual direction of movement without distortion of the image, the image sensing and projecting means being designed and located for minimum visual detection by an observer of the wearer to enhance the illusion that both anatomical members are present, and the device containing no moving parts when mounted on the wearer and in use.

2. The invention in accordance with claim 1, wherein the anatomical members are eyes and the supporting structure includes cosmetic prosthetic eyeglasses, the image sensing and projecting means including a first reflecting surface to receive the image of the present eye and directed to the location of a second reflecting surface, the second reflecting surface located to project the image through the lens of the eyeglass in alignment with the location of the missing eye thereby creating the illusion of a pair of eyes, the second reflecting surface being on a mirror pivotally mounted on the interior side of the eyeglasses and adapted to be shifted into alignment with the two lenses of the eyeglasses so that when one lens is aligned with the present eye the image therefrom will be reflected from the inside of the lens onto the mirror and then projected onto the other lens of the eyeglasses thereby creating the illusion of a second eye at the location of the missing eye.

3. The invention in accordance with claim 1, wherein the anatomical members are eyes and the supporting structure includes cosmetic prosthetic eyeglasses, the image sensing and projecting means including a fiber optics structure positioned to receive the image of the present eye reflected from one eyeglass lens and having a projecting portion in alignment with the other eyeglass lens at the location of the missing eye to project the image of the present eye therethrough thereby creating the appearance of the presence of a pair of eyes.

4. A method of creating the appearance of an anatomical member of a pair when one of the members is missing by use of an imaging device adapted to be removably mounted on a human being at the anatomical member location comprising; positioning the imaging device so that the image from the present anatomical member is projected to a desired location, sensing the projected image at the desired location, directing the sensed image to the location of the missing anatomical member, projecting the image of the present anatomical member from the location of the missing anatomical member with the image projected from the location of the missing member matching the anatomical member with respect to size, contour and actual direction of movement without distortion of the image, the imaging, sensing and projecting being accomplished with minimum visual detection by an observer of the wearer, and retaining the imaging device in fixed position with no moving parts when mounted on the wearer and in use.

5. The invention in accordance with claim 4, wherein the anatomical members are eyes and the imaging device includes cosmetic prosthetic eyeglasses, and the sensing and projecting is accomplished by directing and reflecting the image of the existing eye from one of the lenses of the eyeglass to a mirror at the location of the missing eye and through the other lens of the eyeglasses from the mirror thereby providing the appearance of a pair of eyes on the wearer.

6. The invention in accordance with claim 4, wherein the anatomical members are eyes, the imaging device includes cosmetic prosthetic eyeglasses and the sensing and projecting of the image of the existing eye is accomplished by reflecting the image from one of the lenses of the eyeglasses to a fiber optic structure, transferring the image through the fiber optic structure to the location of the missing eye and projecting the image of the present eye through the second lens of the cosmetic prosthetic eyeglasses at the location of the missing eye thereby giving the appearance of the presence of a pair of eyes for the wearer.

* * * * *